US010744703B2

(12) United States Patent
Gumpinger et al.

(10) Patent No.: US 10,744,703 B2
(45) Date of Patent: Aug. 18, 2020

(54) LINEAR-MOTOR-DRIVEN CONVEYING SYSTEM, IN PARTICULAR STRETCHING SYSTEM

(71) Applicant: BRÜCKNER MASCHINENBAU GMBH & CO. KG, Siegsdorf (DE)

(72) Inventors: Helmut Gumpinger, Anger (DE); Anthimos Giapoulis, Traunstein (DE); Manfred Dusch, Ainring (DE); Wolfgang Eiselmayer, Saalfelden (DE); Jens Adler, Siegsdorf (DE)

(73) Assignee: BRÜCKNER MASCHINENBAU GMBH & CO. KG, Siegsdorf (DE)

(*) Notice: Subject to any disclaimer, the term of this patent is extended or adjusted under 35 U.S.C. 154(b) by 0 days.

(21) Appl. No.: 16/205,573

(22) Filed: Nov. 30, 2018

(65) Prior Publication Data
US 2019/0111611 A1 Apr. 18, 2019

Related U.S. Application Data

(63) Continuation of application No. 14/905,601, filed as application No. PCT/EP2014/001800 on Jul. 1, 2014, now Pat. No. 10,245,779.

(30) Foreign Application Priority Data

Jul. 18, 2013 (DE) .......................... 10 2013 011 965

(51) Int. Cl.
B29C 55/16 (2006.01)
B29C 55/20 (2006.01)
B29K 105/00 (2006.01)

(52) U.S. Cl.
CPC ............ B29C 55/165 (2013.01); B29C 55/20 (2013.01); B29K 2105/256 (2013.01)

(58) Field of Classification Search
CPC ..... B29C 55/20; B29C 55/12; B29C 48/0018; D06C 3/04
(Continued)

(56) References Cited

U.S. PATENT DOCUMENTS 5,072,493 A 12/1991 Hommes et al.

FOREIGN PATENT DOCUMENTS

CN 102395457 3/2012
CN 203019679 6/2013
(Continued)

OTHER PUBLICATIONS

International Search Report for PCT/EP2014/001800, dated Oct. 6, 2014, 3 pages.
(Continued)

Primary Examiner — Matthew J Daniels
Assistant Examiner — Hana C Page
(74) Attorney, Agent, or Firm — Nixon & Vanderhye P.C.

(57) ABSTRACT

An improved linear-motor-operated conveying system is distinguished, inter alia, by the following features: the conveyed web can be fixed to the nipper part, as a result of which a conveyed web plane is defined, said film plane being arranged at a height with respect to the motor working side of the single linear motor drive or of the more powerful linear motor drive in the case of two linear motor drives, and said height being less than or equal to the length of the secondary parts on the conveying parts; the conveying system comprises either a) only one linear motor drive provided beneath the conveying part, or b) only one linear motor drive provided above the conveying part, or c) one linear motor drive arranged beneath and one arranged above the conveying part, the upper linear motor drive and/or the associated control system being configured in such a manner that the upper linear motor drive can only be operated with
(Continued)

Figure 1A:
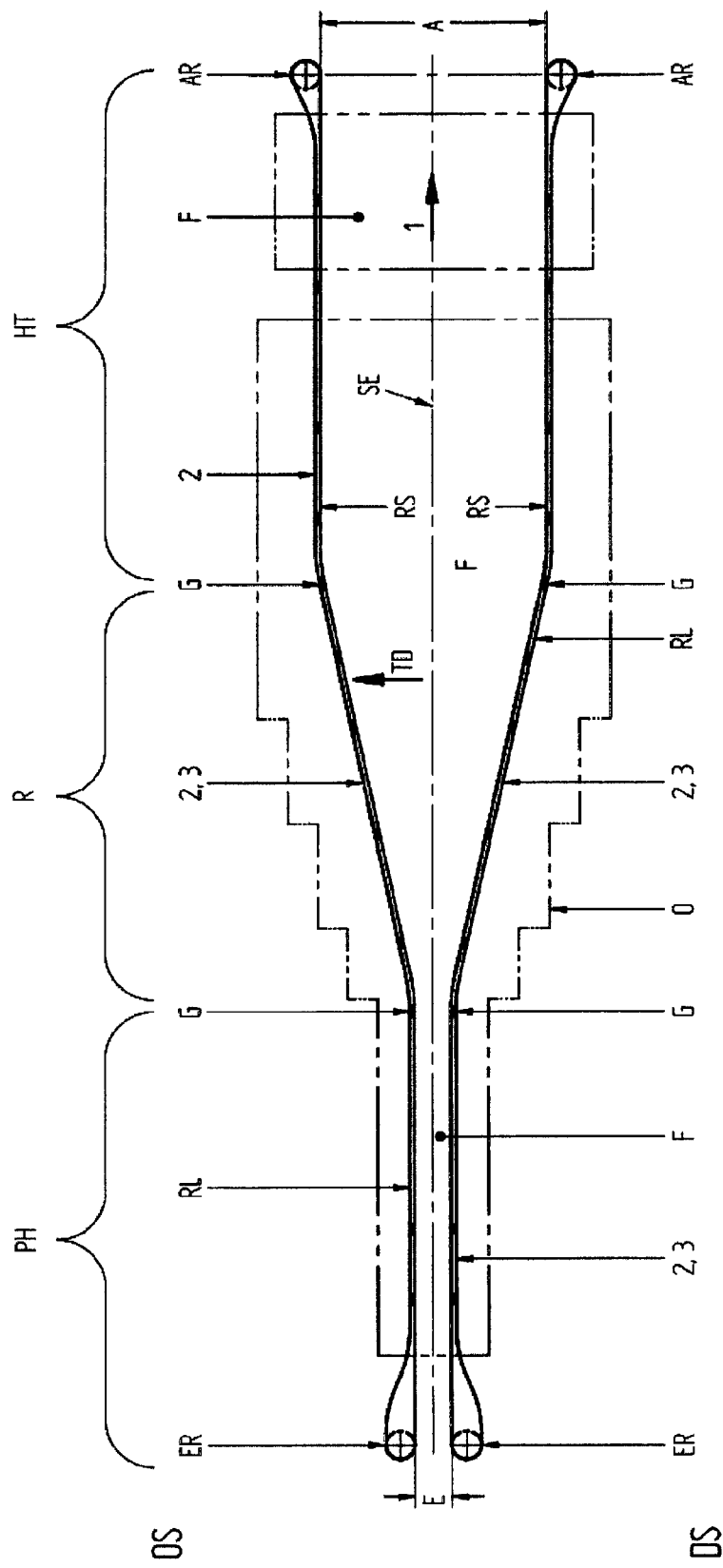

a maximum power of 75% in relation to the maximum power of the lower linear motor drive.

17 Claims, 12 Drawing Sheets

(58) Field of Classification Search
USPC ..................................................... 425/403.1
See application file for complete search history.

(56) References Cited

FOREIGN PATENT DOCUMENTS

| | | |
|---|---:|---:|
| DE | 44 41 020 | 5/1996 |
| DE | 689 25 639 | 10/1996 |
| DE | 44 36 676 | 3/1997 |
| DE | 196 51 515 | 4/1998 |
| DE | 10 2007 057 329 | 6/2009 |
| EP | 0 455 632 | 10/1994 |
| EP | 0 471 052 | 10/1994 |
| EP | 0 422 035 | 2/1996 |
| JP | 2002-103445 | 4/2002 |
| WO | WO 89/12543 | 12/1989 |

OTHER PUBLICATIONS

English translation of Chinese Search Report issued in App. No. 201480040245.5 dated Feb. 28, 2017.

LINEAR-MOTOR-DRIVEN CONVEYING SYSTEM, IN PARTICULAR STRETCHING SYSTEM

This application is a continuation of U.S. application Ser. No. 14/905,601 filed Jan. 15, 2016, which is the U.S. national phase of PCT/EP2014/001800 filed Jul. 1, 2014, which designated the U.S. and claims priority to DE Patent Application No. 10 2013 011 965.0 filed Jul. 18, 2013, the entire contents of each of which are hereby incorporated by reference.

The invention relates to a linear motor-driven conveying system, in particular to a stretching system in the form of a simultaneous stretching system according to the preamble of claim 1.

Stretching systems are used particularly in the production of plastics films. So-called simultaneous stretching systems are known in which a plastics film can be simultaneously stretched in the transverse and longitudinal directions. Also known are sequential stretching systems in which a plastics film is stretched in two successive stages, for example firstly in the longitudinal direction and then in the transverse direction (or vice versa).

The material web to be stretched, i.e. generally a plastics film, is caught by grippers which are arranged on both sides of the material web to be stretched such that they can move on revolving guide rails. The grippers are moved successively from a run-in zone (in which the edge of, for example, a plastics film to be stretched is caught), via a stretching zone (in which the opposite grippers are moved away from one another on the guide rail portions with a transverse component diverging from the conveying direction) to a run-out zone and then on a return path back to the run-in zone, it being possible for the film to be subjected to a particular relaxation and/or thermal aftertreatment, for example, in the run-out zone.

The simultaneous or sequential conveying system mentioned at the outset, particularly in the form of a simultaneous or sequential stretching system usually comprises two revolving guideways which are arranged symmetrically to a vertical plane of symmetry, each guideway comprising a partially or completely revolving guide rail (for example in addition to drive wheels or reversing wheels), along which the conveying elements are moved on the guideway. These conveying units usually comprise gripper units and drive units which are sometimes also known as conveying parts. The guidance and absorption of force of the conveying parts on the guide rail can be performed by sliding elements, rolling elements or by a combination of sliding and rolling elements.

In this respect, the conveying parts are dependent on the respective drive system of the conveying system. For example, if the conveying system is driven by a chain, the gripper part is then connected directly or by a bridge to the chain part. These chain parts are an integral part of the conveying unit. A conveying system of this type in which a chain drive with chain parts is used which is mounted along a guide rail, for example by horizontally and vertically rotating rollers is known for example from DE 44 36 676 C2. It can also be learnt from this document that instead of the mentioned rollers, under certain circumstances other guide means may sometimes also be used, for example using a plain bearing.

Furthermore, a conveying system having a roller bearing is known from EP 0 471 052 B1. Thus, in all these cases, the entire conveying system is driven by a conveyor chain.

In contrast thereto, conveying systems and particularly simultaneous stretching systems are known in which the individual conveying units take place not via a conveyor chain (as an integral part of the drive system), but on the basis of linear motors. A linear motor-driven conveying system of this type is known for example from WO 89/12543 A1 or from DE 44 41 020 C1.

These linear motor-driven conveying systems and in particular stretching and simultaneous stretching systems are usually constructed such that the gripper part is connected to the actual drive unit or conveying unit by a bridge. The drive forces are introduced, for example via flanged-on secondary parts, for example in the form of permanent magnets (using an associated magnet cage) which are attached to the drive units and conveying units such that they can be moved therewith. In this respect, it is also possible to provide between the conveying units, driven by a linear motor drive, idling conveying units, so-called "idlers" which are not fitted with a secondary part of this type using permanent magnets. Otherwise, these non-driven conveying units are constructed corresponding to the driven conveying units and they are also moved by film forces introduced via the material web to be stretched, usually via the plastics film to be stretched, since the corresponding grippers catch the edge of the film while the film web passes through in the draw-off direction. By means of the gripper units, the conveying units driven by the linear motor thereby move the plastics film to be stretched through the film system, the interlying, non-driven conveying units then also being moved by the plastics film which is moved through the system.

The conveying units can be guided inside the guide rail and/or on the support rail by sliding guide means and/or by roller guide means or by roller units or by a combination thereof, depending on the conveying system.

The feed using permanent magnets, the so-called conveying units fitted with secondary parts, is carried out by primary units, i.e. by bobbins and windings which are provided in a stationary manner along the guideway and by which corresponding electromagnetic fields can be generated, using which the conveying units fitted with the permanent magnets (secondary parts) then continue to be moved along the guideway.

In this respect, it is known from the prior art, for example from EP 0 422 035 B1 or from EP 0 455 632 B1 that in linear motor-driven stretching systems of this type, the primary and secondary parts are arranged symmetrically to the guideway, i.e. symmetrically to the guide rail, the attractive forces of the motors, which are provided on the upper side and on the underside of the conveying units, being almost cancelled out.

However, in addition thereto, asymmetrical arrangements are also known. Thus, for example EP 0 422 035 B1 which has already been mentioned above discloses an asymmetrical system based on FIG. 13. An asymmetrical system is also disclosed by the plant known from JP 2002-103445 (in FIGS. 4 and 5 thereof), although this is associated with the disadvantage that these systems result in an unfavourable introduction of force. Consequently, the components are stressed excessively and/or very complex structures of the primary parts become necessary in the curve portions.

However, a symmetrical construction also has disadvantages in respect of the arrangement of the upper and lower linear motor drives. In this case, it is problematic that due to the symmetrical introduction of force by a linear drive positioned above the guide rail and by a linear drive positioned below the rail, the forces are virtually cancelled out in the vertical direction, with the result that the conveying unit, i.e. the gripper, can run virtually weightlessly on the rails. However, this can then lead to vibrations which are caused by the groove division or by the groove latching forces. These vibrations are ultimately responsible for bearing damage and undefined movement states, particularly in the return region of the stretching system.

Compared thereto, the object of the present invention is to provide an improved linear motor drive for a conveying system, particularly for a stretching system and in this respect for a simultaneous stretching system, which linear motor drive allows a stabilised run of the conveying units under a low load.

This object is achieved according to the invention by the features stated in claim 1. Advantageous embodiments of the invention are set out in the subclaims.

The present invention proceeds from the understanding that an additional low stabilising force for preventing or suppressing vibrations can be generated using an asymmetrical linear motor drive.

In other words, it is provided within the scope of the invention that the asymmetrical linear motor drive is especially provided only in the form of a linear motor drive which is located under the conveying unit and which, through the omission of the opposite upper linear motor drive, exerts attractive forces which also contribute towards stabilising the entire system, in addition to the gravitational forces which act on the conveying units.

In an alternative solution, it would also be conceivable for the linear motor drive which is only provided on one side, to be provided above and not below the conveying units.

Both solutions also have the advantage that the overall height of the conveying system and thereby also the distance of the heating registers (nozzle boxes) in the oven can be reduced. This means that the energy required for the process heat is reduced. Furthermore, only one row of linear motor primary parts has to be cooled. Overall, in addition to the stabilisation of the conveying system, the energy required by the oven is also significantly reduced.

Finally, within the scope of the invention, an asymmetrical linear motor drive can also be provided insofar as a linear motor drive is provided both above and below the guideway and particularly above and below the guide rail, which linear motor drive differs, however, in its power. The power of one linear motor drive is to be lower than that of the other. For example, the upper linear motor drive is to have at most only 75% of the force and thereby also not more than 75% of the attractive force of the linear motor drive realised below the guide rail. The weaker linear motor drive may possibly also generate only 60%, 50% or 40 and less power, force and in particular attractive force, based on the respectively more powerful linear motor drive. In this respect, the weaker linear motor drive and the stronger linear motor drive are preferably configured in the lower position, i.e. under the guide rail.

However, these measures per se would not contribute towards the satisfactory realisation of the desired advantages according to the invention.

As already stated at the outset, although asymmetrical, linear motor-driven systems are already known in the prior art, these known systems have not, however, made a contribution towards enabling the asymmetrically introduced drive forces to also be used at the same time as the attractive force to stabilise the individual conveying units. The invention proposes further steps here in particular.

Accordingly, within the scope of the invention it has also been shown that a further improvement in the running behaviour, i.e. a further improvement in the stabilisation of the running behaviour and a reduction in or prevention of undesirable vibrations on the individual conveying units, can be realised in that the plane of engagement on the grippers must be at a particular distance from the upper side of the motor (when the linear motor drive is configured below the guide rail) and/or at a particular distance from the lower side of the motor when, alternatively or additionally, a linear motor drive is provided above the guide rail. In the case of a stretching system, the mentioned engagement plane on the grippers is the plane in which the film to be stretched is held clamped on the gripper table by the gripper, i.e. the film plane via which the corresponding forces act in the stretching procedure.

Finally, however, the magnet length of the secondary parts must be in a particular relationship with the above-mentioned distance from the upper side or lower side of the motor of the upper or lower linear motor drives. It is thereby possible to ensure that the force introduction by the secondary parts (magnets) preferably provided above or below does not play a part in generating undesirable vibrations.

Finally, it has also been shown that the entire arrangement only leads to satisfactory results when a guide length, i.e. the distance between the rollers and/or the plain bearings, seen in the direction of travel, is shorter than the mentioned magnet length of the secondary parts. When roller bearings are used, this guide length is fixed through the centre of the bearing axis. When plain bearings are used, the guide length is defined by the distance between the centre of a first plain bearing to the centre of an adjacent plain bearing in the direction of travel.

However, further preferred embodiments are possible within the scope of the invention.

Thus, it is possible particularly when only one linear motor drive is used under the guideway to dispense with the counter rolls or support rolls which otherwise rotate about horizontal axes under the guideway. It is not only the gravitational forces, but also the attractive forces of the linear motor drive configured under the conveying unit which act on the conveying units.

Particularly in this case, instead of the otherwise usual guideway which is rectangular in cross section, it is also possible for completely differently configured guideways to be used, for example guideways in which the rollers, rotating about horizontal axes, or sliding elements are at least indirectly supported on a cross member of the guide rail in further remote positions from one another.

It is also favourable if the centre of gravity of a conveying unit including an associated gripper only deviates from a central vertical plane running through the guide rail by up to a maximum extent. Since the force thereby engages more centrally on the conveying unit, an undesirable tilting effect is avoided.

Finally, it has also been found that the maximum distance of the centre of gravity of a gripper drive unit from the centre of the guide rail depends on a further variable, namely on the predetermined lateral offset of an upper pair of rollers which runs on the upper side of the guide rail, by which the weight and the attractive forces, introduced by the linear motor drive, of the respective gripper/conveying unit is supported.

Finally, it should also be mentioned that it has proved to be favourable within the scope of the invention if the support rolls and/or sliding elements, displaceable lengthways on the upper side of a guide rail and/or support rail, are loaded symmetrically by the linear motor drive arrangement.

The solution according to the invention is all the more surprising because hitherto an asymmetrical linear motor drive has always been avoided. Up until now, it has been assumed that an asymmetrical construction of this type of the linear motor drive not only results in a reduction in the entire drive forces which are generated (particularly when a single linear motor drive is provided only on the lower side or only on the upper side), but that also the roller load and/or sliding element load is thereby changed disadvantageously by the attractive force if, for example, only a single lower linear motor drive is provided, so that the weight forces and the drive forces add up.

It is all the more surprising that due to the asymmetrical linear motor drive, it is finally possible to use the attractive force between the primary and secondary parts as a stabilising force for the entire system.

As a result of using the attractive force between the primary parts and secondary parts of the linear motor drive as a stabilising force, which is possible within the scope of the invention, vibrations which hitherto have always arisen are avoided. In this respect, the conveying units run smoothly in all operating conditions.

Furthermore, within the scope of the invention, the energy consumption can also be minimised. The overall height of the system can also be significantly reduced, which results in a shorter distance in the oven between the film and the ventilation system. As a result, the required amount of air and thereby the ventilator power and heating power are also reduced. In addition, the overall height of the oven becomes shorter, which results in lower investment costs.

Previous drive systems have suffered relatively great losses in an oven due to the double-row arrangement of the motors. The overall lower height means that the distances of the nozzle boxes can be significantly reduced. Thus, significantly less heating power is required for the oven to guide the film at the suitable processing temperature. Furthermore, only the cooling power for one row of linear motors is required.

The present invention with preferably only one row of linear motors (preferably under the conveying units) requires significantly less cooling power, as a result of which the energy consumption, i.e. the heating power of the oven, is also significantly reduced, the heating power being required to bring the material web, particularly in the form of a plastics film, which is to be stretched to the required stretching temperature and to keep it there.

Figure 1B:
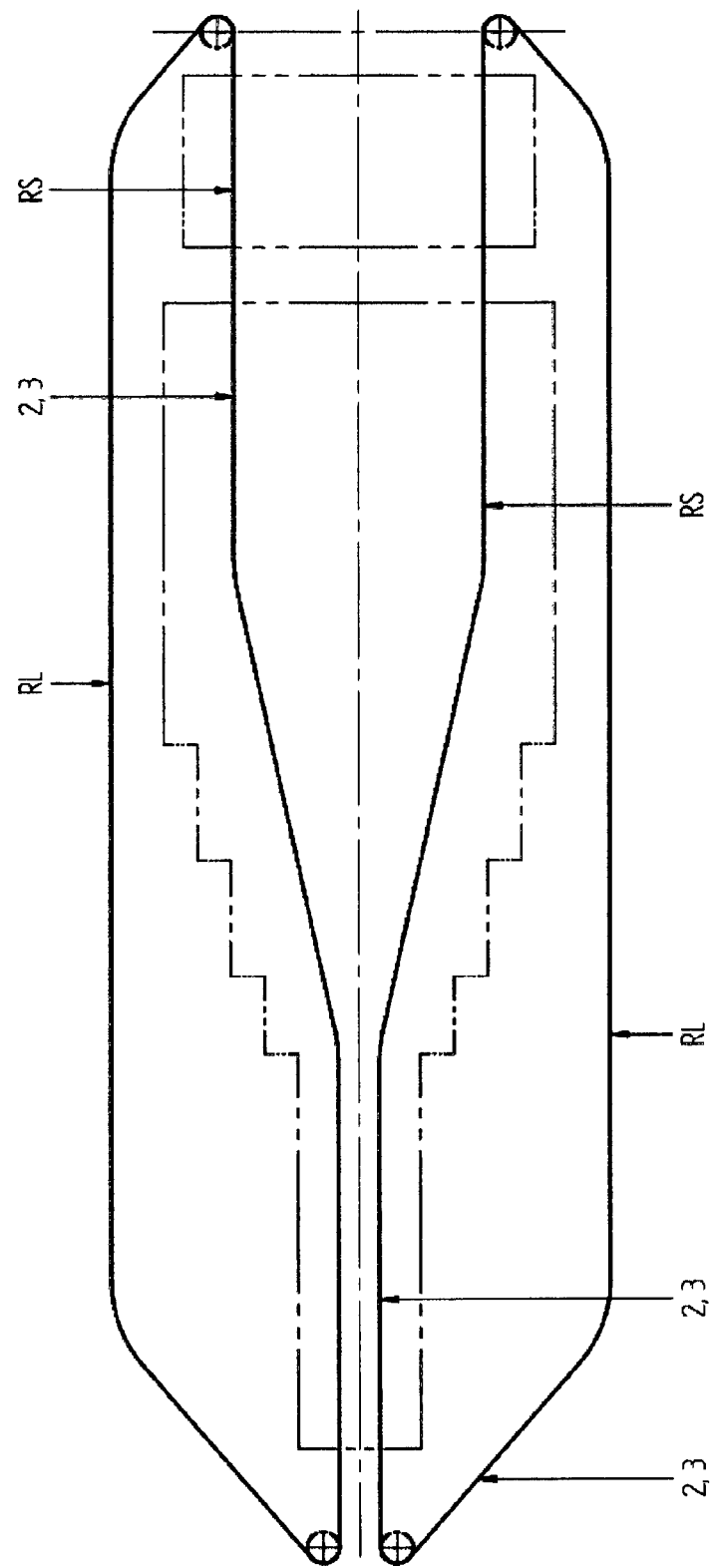
Figure 2:
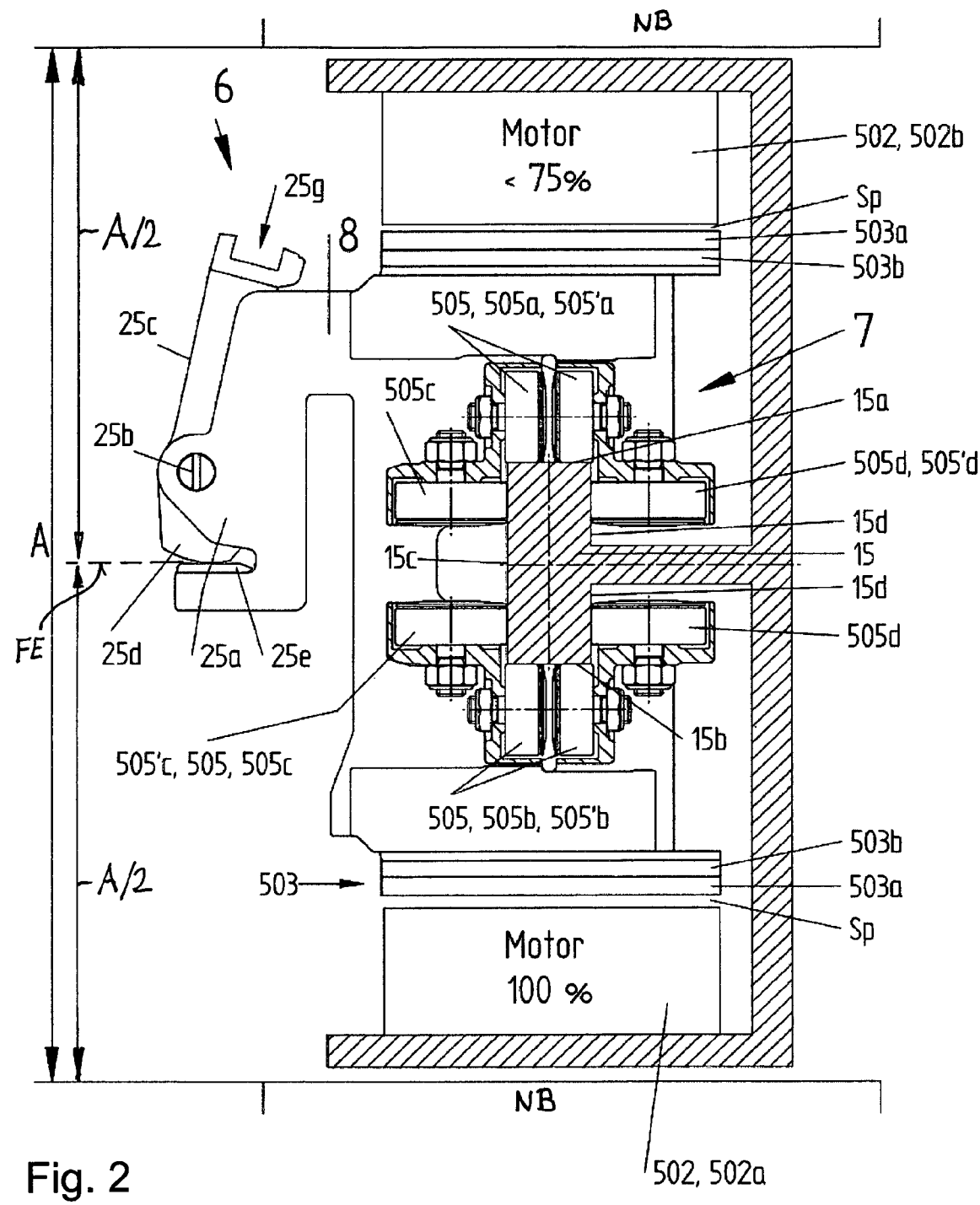
Figure 3:
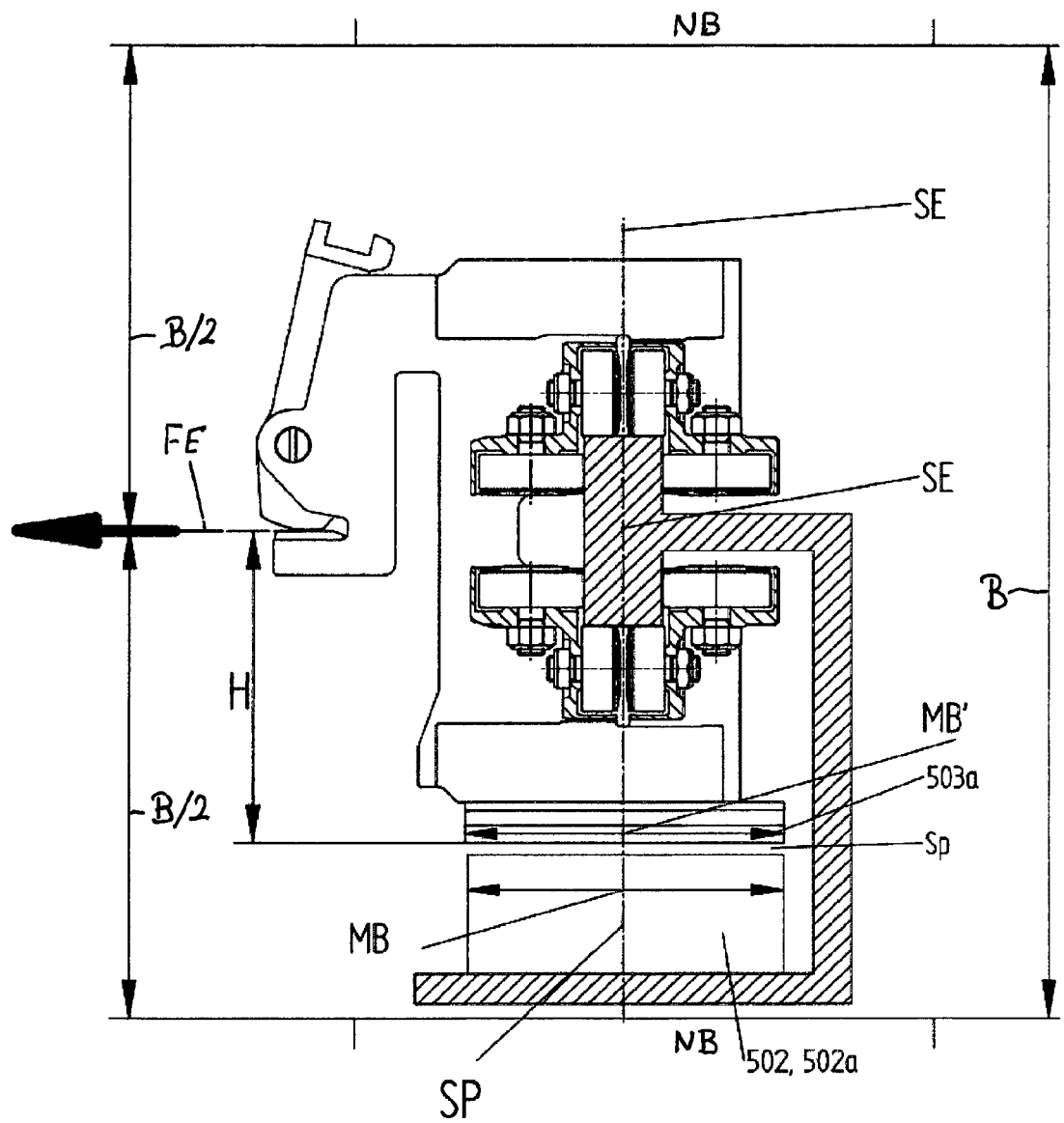
Figure 4:
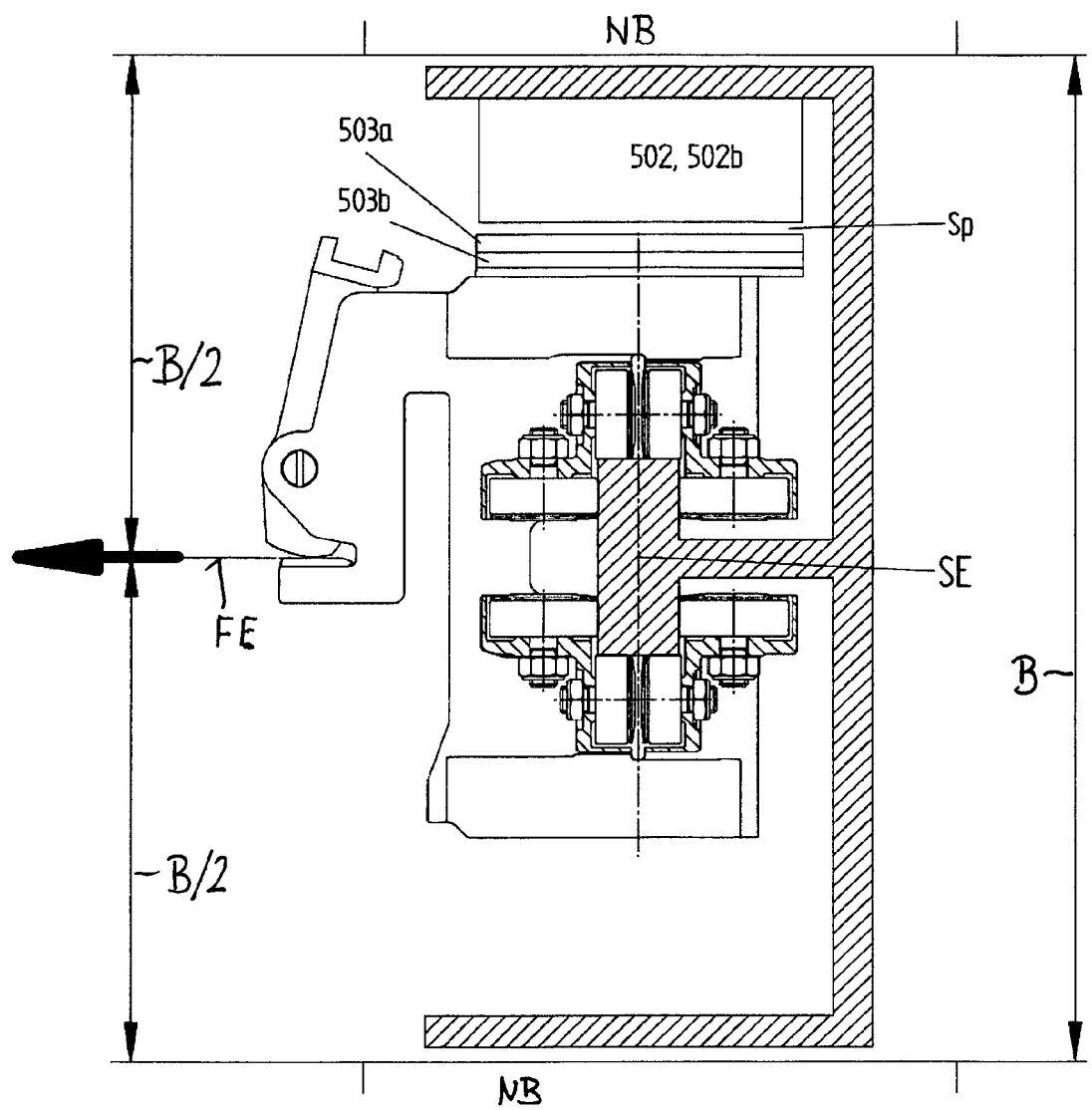
Figure 5:
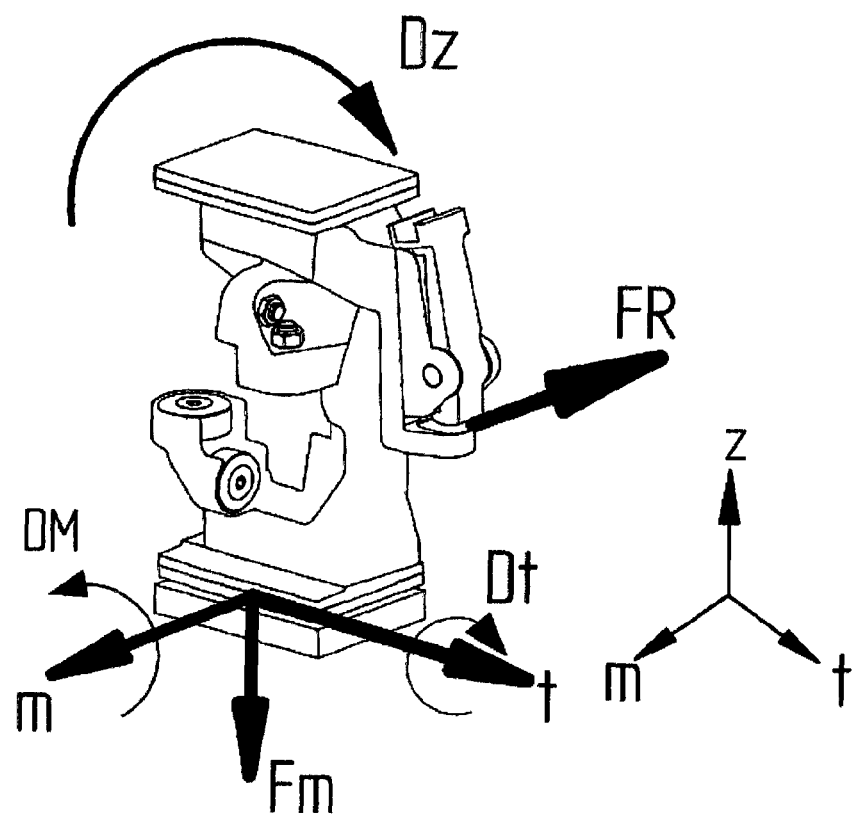
Figure 6A:
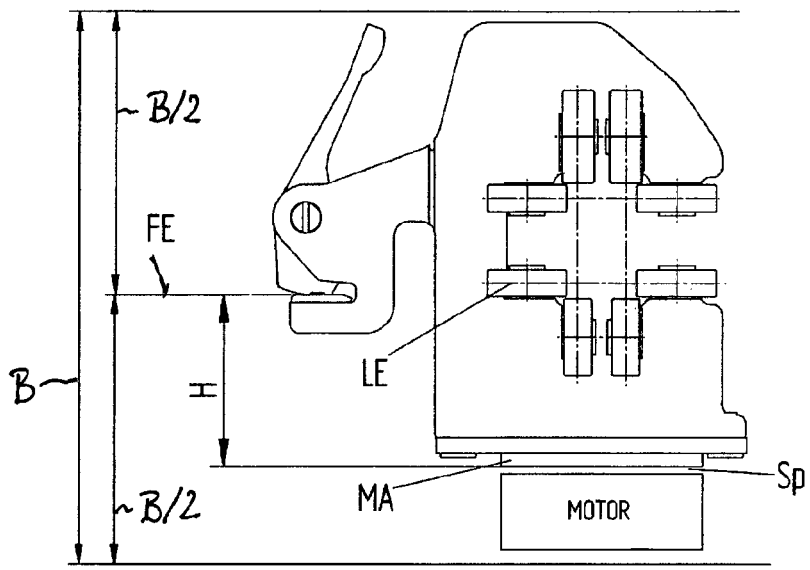
Figure 6B:
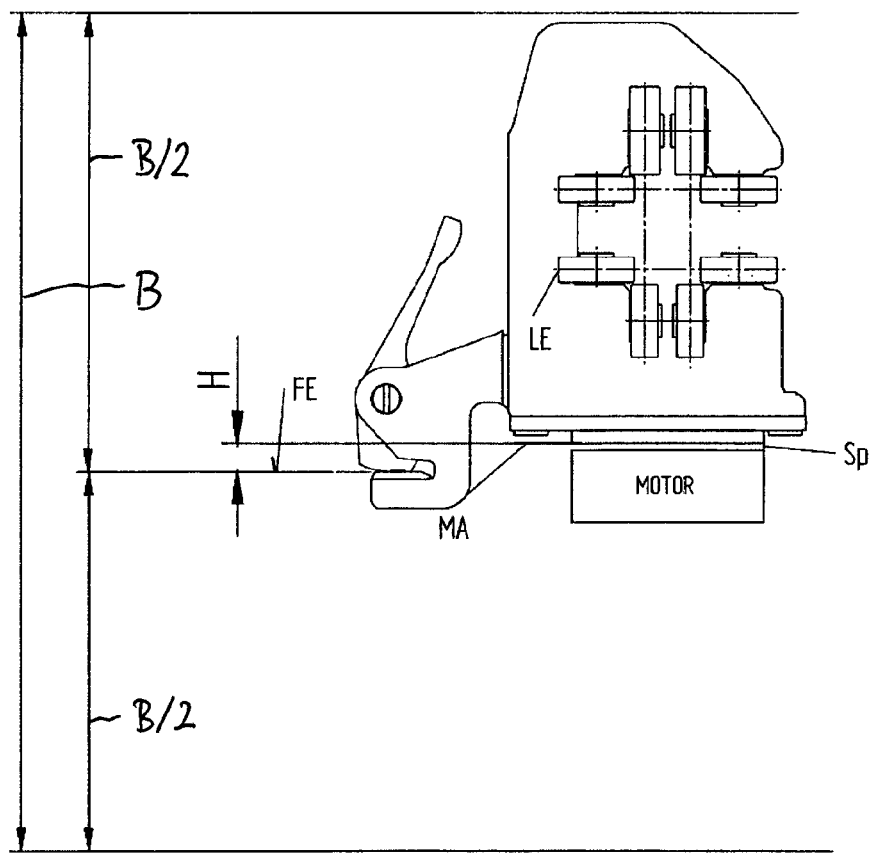
Figure 7:
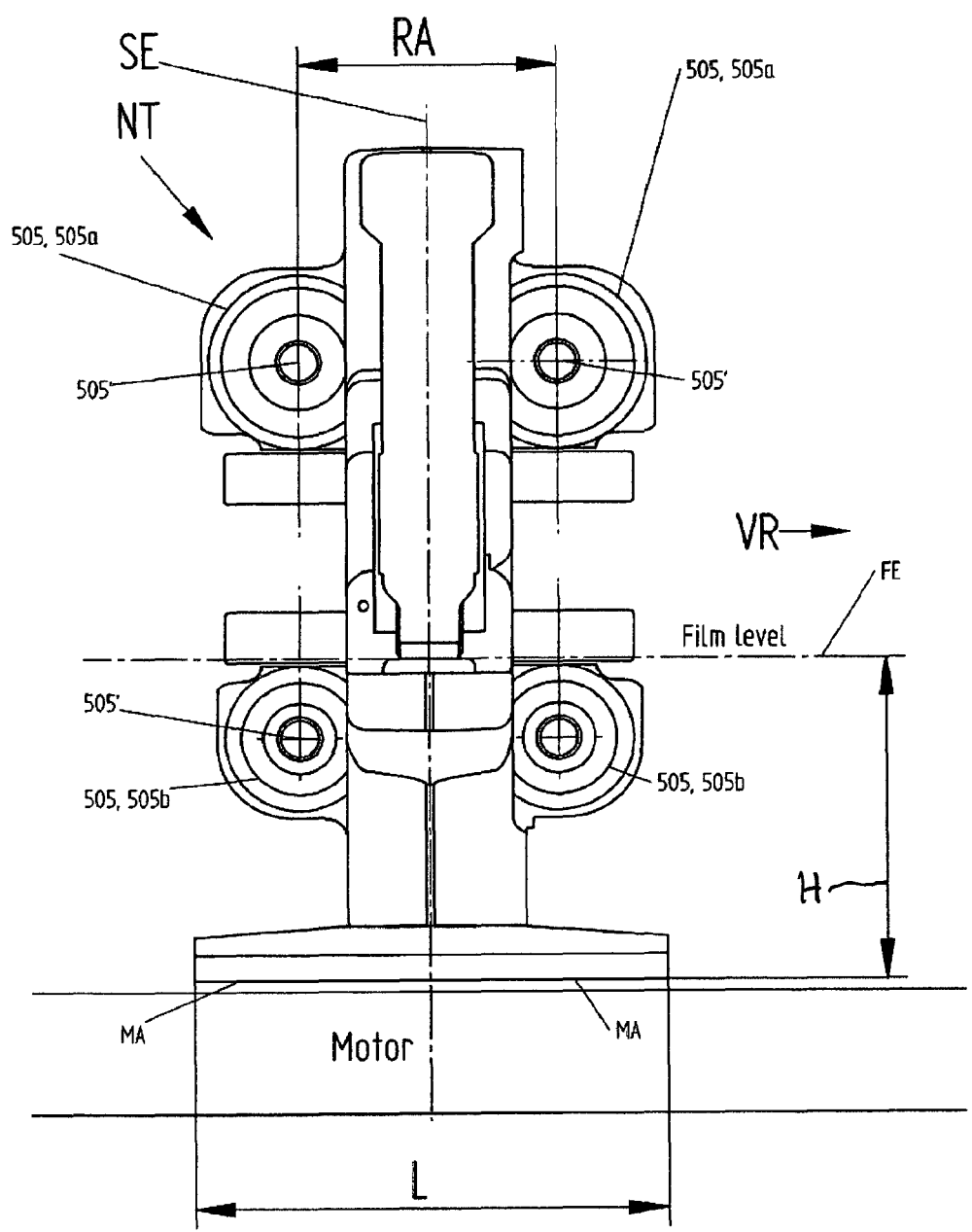
Figure 8:
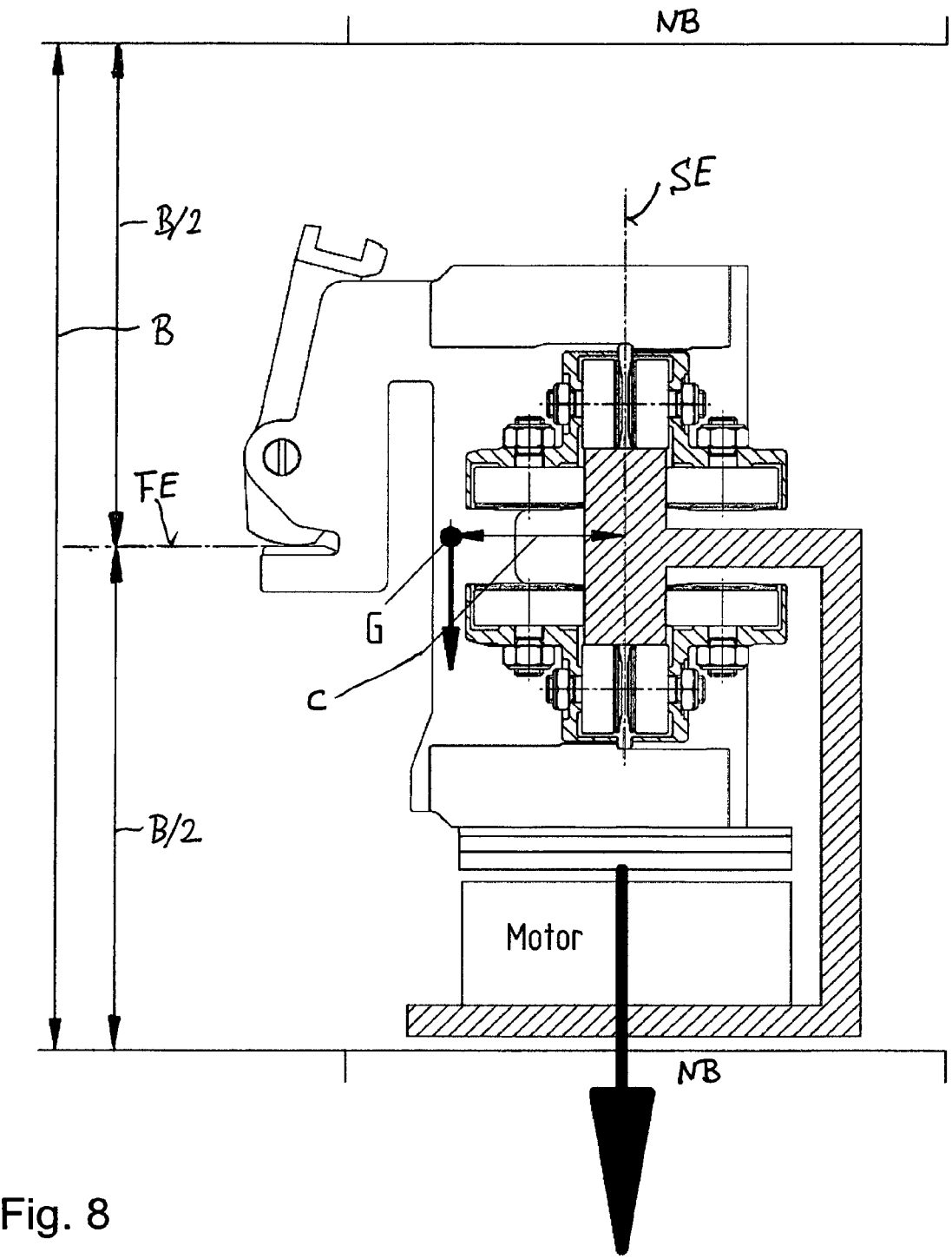
Figure 9:
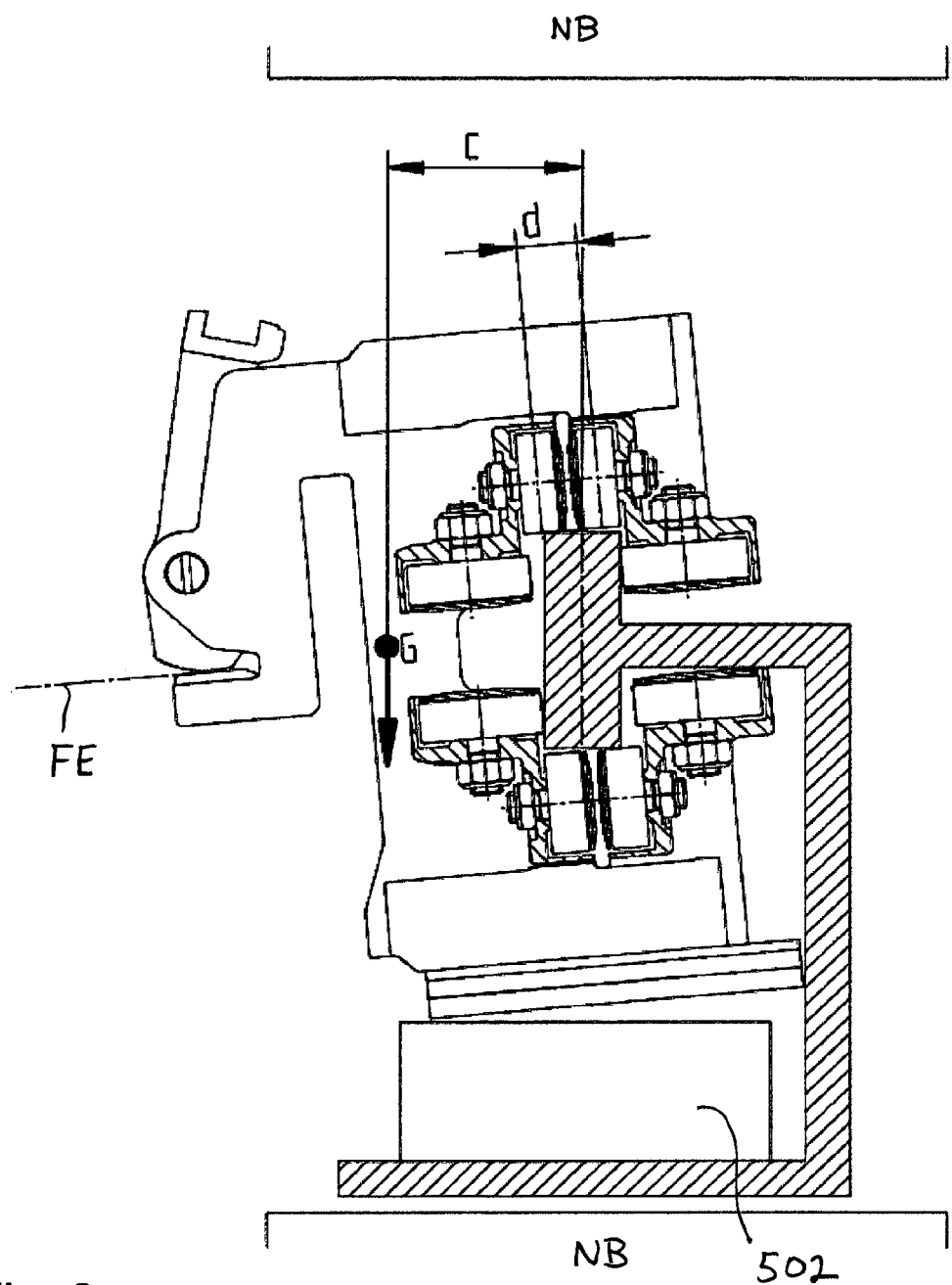
Figure 10:
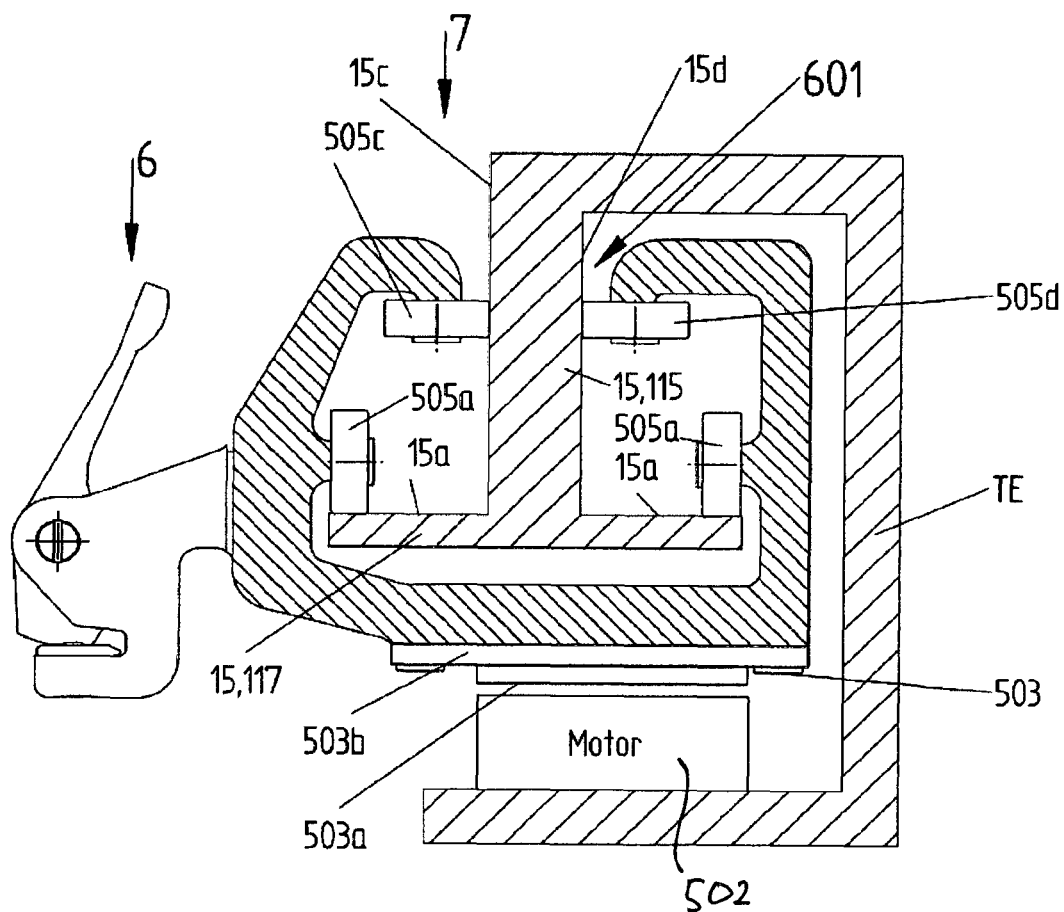
Figure 11:
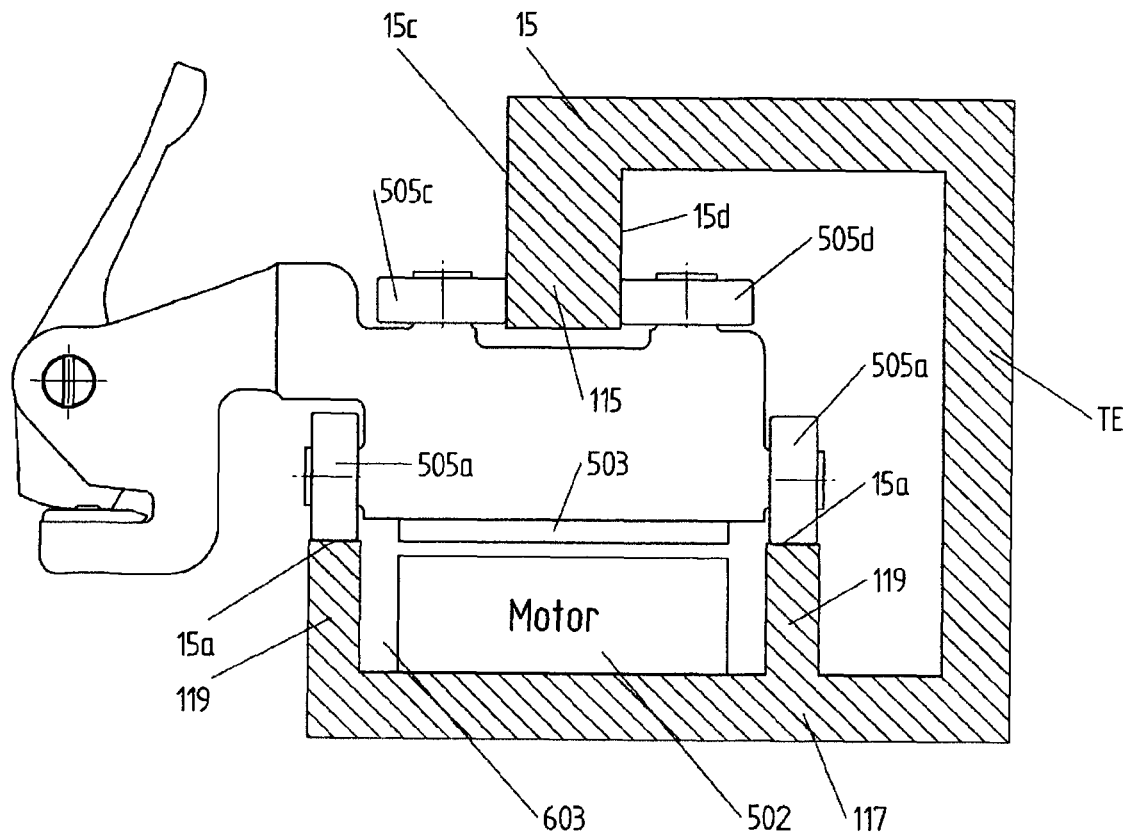

In the following, the invention will be described in more detail with reference to drawings, in which:

FIG. 1a: is a schematic plan view of a simultaneous stretching system with a common support structure for the process side and the return side inside an oven;

FIG. 1b: shows a modified embodiment, compared to FIG. 1a, of a return side, separate from the process side, for the gripper-conveying units;

FIG. 2: is a schematic cross-sectional view transversely to the longitudinal direction of the guide rail of a simultaneous stretching system to illustrate a first embodiment of a linear motor-driven gripper-conveying unit;

FIG. 3: shows a modified embodiment, compared to FIG. 2, with only one lower linear motor drive;

FIG. 4: shows a modified embodiment, compared to FIG. 3, with one linear motor drive configured only above the guide rail;

FIG. 5: is a spatial view of a gripper-conveying unit with an explanation of the forces which arise and are applied there;

FIG. 6a: is a schematic side view of a modified embodiment to illustrate a predetermined height distance between a film plane and a motor engagement plane of a lower linear motor;

FIG. 6b: shows a modified embodiment, compared to FIG. 6a, with a film plane located under the motor engagement plane, also with a lower linear motor drive;

FIG. 7: is a schematic side view transversely to the feed direction of a gripper-conveying unit to illustrate further constructive measures and conditions for improving the running behaviour;

FIG. 8: is a cross-sectional view through a gripper-conveying unit to illustrate a maximum lateral distance of the centre of gravity of the gripper-conveying unit, based on a guide rail plane which passes through the guide rail centrally and vertically;

FIG. 9: is a view, comparable with that of FIG. 8, to illustrate a maximum lateral distance between guide rollers to reduce a sideways tilting risk;

FIG. 10: is a cross-sectional view through a modified embodiment of a gripper-conveying unit; and FIG. 11: is a cross-sectional view of another modification of a gripper-conveying unit.

The linear motor-driven conveying system is described in the following with reference to a simultaneous stretching system.

A stretching system of this type has two symmetrical drive systems which are symmetrical to a centre plane of symmetry SE extending vertically to the plane of the drawing. FIG. 1a shows the two drive systems arranged symmetrically to the plane of symmetry SE in the draw-off direction 1, the material web to be treated, i.e. to be stretched, particularly in the form of a plastics film F being moved through in the draw-off direction 1 between the two drive systems which revolve on closed paths 2.

An unstretched film F ("film" being stated in the following although a stretching system of this type can accordingly generally treat a web F to be treated and can simultaneously stretch it lengthways and crossways, so that in this respect, the invention is not restricted to a web of plastics film), runs into the stretching system in the run-in region E and there it is caught and clamped at both edges 8 by grippers, to be described in the following and shown for example in FIG. 2, more specifically on the operator side OS and on the drive side DS. The film F is then heated in a subsequent preheating zone PH and is subsequently delivered to a stretching zone R to be stretched simultaneously in the longitudinal and transverse directions. Thereafter, the stretched film F passes through different heat treatment zones HT where the film can also be relaxed. At the end of the stretching system in what is known as the run-out zone A, the film is released from the grippers by suitable means and it then leaves the simultaneous stretching system.

In other respects, as is also shown in FIG. 1b, the guide rail can extend differently in the prerun and thereby in the stretching region and also in the return region, namely such that, for example, only the guide rail passes through an oven O and is returned on the return side outside the oven. In this respect, reference is made to known stretching systems and to associated superstructures.

In the following, reference is made to FIG. 2 which is a cross-sectional view of a linear motor-driven simultaneous stretching system with an associated gripper and conveying part.

FIG. 2 thus shows a gripper-conveying unit KT comprising the gripper part 6 and the conveying part 7. The gripper part 6 is connected to the conveying part 7 by a bridge 8.

Depending on the perspective, the gripper bridge 8 can be added to the conveying part or to the gripper part. Located under this bridge part 8 is a downwardly open U-shaped opening, by which the gripper part 6 is slightly offset from the actual conveying part 7.

As usual, the gripper part comprises a gripper lever 25*c* which is sometimes also called a blade flap 25*c*. This gripper lever 25*c* can be swivelled about a gripper pivot 25*b* running parallel to the guide rail, such that the gripper lever 25*c* can tilt between an open position and a closed position. If required, for example two gripper levers can also be provided which can swivel separately and are positioned in tandem offset in the direction of the guide rail.

The gripper mechanism or gripper portion 25 which can be seen in the drawing also comprises a gripper mount 25*a* which, for example, consists of or comprises two gripper cheeks, offset in the horizontal direction. Running between said cheeks is the mentioned horizontal gripper pivot 25*b* by which the corresponding gripper lever 25*c* (also called a blade flap 25*c*) can swivel, as mentioned, between a release position and a fixed position in which the lower gripping or fixing portion 25*d* thereof fixes, for example a conveyed web, in the case of a film stretching system, a film between the gripping surface 25*d* and a gripper table 25*e*, i.e. the web can be clamped and secured.

Located at the upper end of the gripper lever 25*c*, opposite the clamping portion 25*d* thereof is thus a U-shaped magnetic closure part 25*g* which extends in cross section transversely to the guide rail for example and which cooperates with a corresponding mechanism along the guide rail so that in the run-in part, the gripper lever clamps the edge of a conveyed web or film web on the conveying table and releases it again at the end of the stretching system by swivelling into the open position.

The actual construction of the linear motor-driven simultaneous stretching system with the corresponding linear motor drive is known for example from EP 0 455 632 B1 or from DE 44 36 676 C2, reference being made to the full disclosure thereof. The cross-sectional view shown in FIG. 2 presents the guide and support rail 15, where it can be seen that this guide rail has a rectangular cross section, more specifically with an upper horizontal running surface 15*a*, a lower horizontal boundary surface or running surface 15*b* and two vertically oriented running surfaces, namely a first vertically oriented running surface 15*c*, located on the gripper side and a vertical running surface 15*d* which is opposite thereto, i.e. remote from the gripper.

In the described embodiment, running on each running surface in each case is at least one pair of rollers 505, namely an upper pair of rollers 505*a* which rotates about a horizontal axis. The entire weight of the associated conveying part with the gripper part connected thereto is received and supported by this pair of rollers.

In the embodiment shown, a lower pair of rollers 505*b* is also provided which also rotates about a horizontal rotational axis and rolls on the lower running surface 15*b*. This pair of rollers is used only for safety so that the conveying part concerned, with the associated gripper part, cannot lift off upwards with the guide rail. However, the usual weights and the attractive forces, to be discussed in the following, in respect of the linear motor drive are adequate so that under some circumstances it is possible to dispense with this lower pair of rollers 505*b*.

Finally, also provided on the gripper side is a pair of rollers 505*c* and opposite thereto a pair of rollers 505*d* which rolls on the relevant vertical running surfaces 15*c* and 15*d*. The conveying part 7 is guided and mounted thereby. The corresponding guide rail 15 is held via a plurality of horizontal supports in spacings which are offset in the longitudinal direction of the guide rail and which respectively run in the free space 401 remote from the gripper between the upper and lower running wheel 505*d* and are rigidly connected to the guide rail.

However, instead of the mentioned rollers or running wheels 505, corresponding sliding elements 505' can also be provided, for example sliding elements 505'*a*, 505'*b*, 505'*c* and 505'*d*. Combined embodiments are equally possible, sometimes using running wheels and sometimes using sliding elements.

The corresponding conveying part is driven by linear motors which comprise stationary primary parts 502 and secondary parts 503 movable with the gripper conveying parts KT. In other words, the grippers, i.e. the gripper parts 6, are displaced and moved lengthways with the conveying parts 7 by means of the primary parts 502 and the secondary parts 503 along the guide rail 15 which here simultaneously also acts as a conveying rail 15 (monorail).

The mentioned primary parts 502 are attached parallel to the guide and support rail 15. The secondary parts 503 consist of the mentioned permanent magnets 503*a* which are fastened in a respective holding cage 503*b* which, in turn, is held on the gripper body 6.

As can be seen in FIG. 2 and also in the following drawings, formed between the primary and the secondary part 502, 503 is a small spacing gap Sp via which the electromagnetic waves, generated by the primary part, act on the permanent magnet 503*a* on the conveying part and thereby move the conveying part in the feed direction.

Deviating from the embodiment shown, instead of the roller bearings, it is also possible for plain bearings to be provided wholly or partially, in which case the running surfaces on the guide rail are then configured as sliding surfaces 15*a*-15*d* which are preferably coated with particularly low-friction, slidable layers.

To reduce vibrations which possibly arise particularly on the return side of the stretching system, on the conveying parts and thereby on the grippers, it is provided according to the invention that for example the upper or lower, but preferably the upper primary part (motor) of the linear motor drive is provided with a weaker power and preferably with a very much lower power than the lower linear motor drive 502, 502*a*. The power, i.e. the force generated by the upper primary part 502, 502*b*, including the feed force and attractive force, should preferably be less than 75%, in particular less than at most 70%, 60%, 50%, 40%, 30%, 25% or 20% of the corresponding force, i.e. drive force and/or attractive force which can be generated by the lower primary part 502, 502*a*.

To illustrate the energy saving options, the nozzle boxes NB are indicated schematically here, more specifically as an upper nozzle box NB and as a lower nozzle box NB, between which the conveyed web F to be processed, in particular a plastics film to be stretched, is guided through the system.

The nozzle boxes NB shown in cross section in FIG. 2 and in FIG. 3 are always positioned symmetrically to the film plane FE, thus in the case of double-sided motors, at a distance A/2, as shown in FIG. 2. Installation space is saved in the case of an asymmetrical arrangement of the motors, in particular when only one linear motor drive preferably provided under the guide rail is used. In this case, the two nozzle boxes NB which are positioned vertically one above the other can be arranged at a distance B which is shorter than distance A between the nozzle boxes according to the embodiment of FIG. 2 when an upper and a lower linear motor drive is used. However, also in the embodiment according to FIG. 3 with only one lower linear motor drive, the film plane must lie symmetrically, i.e. it must lie centrally between the two nozzle boxes NB, which is why the gripper is formed and positioned with the gripper table so that the transported web and thereby the plastics film is respectively at a distance B/2 from the upper nozzle box and from the lower nozzle box. Thus, since with asymmetrical arrangements the distance B<A, nozzle boxes can thus be arranged at distance B/2 centre-symmetrically to the film plane (where A for example can be a value of between 250 mm and 700 mm. In contrast thereto, the value for B can be, for example from 150 mm to 700 mm, i.e. in particular it can be less than 600 mm, in particular less than 500 mm, 400 mm, 300 mm, 250 mm and in particular even less than 200 mm). As mentioned, the exact central position for the film plane FE (i.e. for the conveyed web) is the explicitly preferred position so that the flow forces which act on the conveyed web from above and below from the nozzle boxes NB are equalised. If there is to be a deviation from the exact central position, the deviation should be as small as possible, in particular less than 10%, if possible less than 9%, 8%, 7%, 6%, 5%, 4%, 3%, 2% or even less than 1%, more specifically based on the distance between the upper and lower nozzle boxes NB.

In a preferred embodiment, as shown in FIG. 3, only one linear motor drive is used, namely with lower primary parts 502, 502a and permanent magnets 503a configured under the conveying part 7, so that as a result, in addition to the weight forces on the conveying part 7, feed forces and attractive forces are applied to the gripper part 6.

FIG. 4 shows only in a basic manner that within the scope of the invention, the only asymmetrically provided drive could also be positioned above, i.e. with an upper primary part 502, 502b, without a lower linear motor drive also being provided.

The measures which have been described are however not yet adequate to realise a drive which is as gentle and as low in vibrations as possible. To be able to more effectively classify the measures also provided within the scope of the invention, the forces which can arise on a conveying part and thereby on a gripper part during a revolving movement on the guideway will firstly be described in the following with reference to FIG. 4.

When the conveying unit revolves on the guideway, alternating operating conditions can be distinguished which, during the stretching of a conveyed web and particularly of a plastics film, result in the force direction engaging on the conveying part also being able to partially and temporarily reverse. Thus, for stretching a film at the start of the stretching zone R, a force has to be applied against the direction of movement, whereas at the end of the stretching zone, a force has to be applied in the direction of movement. For an asymmetrical construction, this leads in principle to torques, to tilting forces and to tilting moments in addition to the forces and moments which engage on the conveying parts and grippers even in the case of a symmetrical liner motor drive when a respective linear motor, positioned above and below is provided with the same power. Furthermore, a resulting stretching force FR through the conveyed web, preferably in the form of a plastics film, which is moved on and is to be stretched by the system, as well as the weight force FG, the motor force FM and additional centrifugal forces also act on the conveying unit KT.

FIG. 5 schematically shows the force and torque engagements arising on a conveying part. The coordinate m describes the path along the guide rail, and t represents a direction vertical thereto. z stands vertically on the plane spanned by vector m and vector t. However, this coordinate system is not to be confused with the machine direction MD or with the transverse orientation TD, i.e. the transverse orientation vertically to the conveying direction of the conveyed web, particularly in the form of the plastics film which is to be stretched. Subject to the stretching forces FR for example, corresponding torques Dz, Dt and Dm are then formed from the resulting force directions.

To enable the conveying unit to run with the associated gripper parts as smoothly as possible with as few vibrations as possible, it is provided that the linear motor drive is symmetrical, based on the horizontal running surfaces 15a, 15b, i.e. here it leads to a symmetrical load of the support roll 505a (and 505b).

As can be seen from FIGS. 2, 3 and 4, regardless of whether only a lower-positioned linear motor or only an upper-positioned linear motor or whether a drive with a lower and an upper linear motor is provided (in which case the two linear motor drives are then provided with power of a different magnitude), the respective linear motor drive with the associated primary parts in the form of magnetic coils and with the secondary parts which are configured on the conveying parts, are displaceable therewith and are in the form of the magnets provided there are arranged symmetrically to the plane of symmetry SE running centrally through the guide rail. In other words, the respective centre or centre of gravity SP of the associated primary part and/or secondary part should not deviate by more than 20%, in particular by less than 15%, 10% or in particular by less than 5%, 4%, 3%, 2% or even by less than 1%, based on the entire motor width MB or MB' of the secondary part 503 from the vertical plane of symmetry SE running centrally through the guide rail (FIG. 3). (SP can have, for example, a value of 32 mm and MB can have a value of 180 mm, although these values can also vary widely).

In the following, reference will be made to FIGS. 6a and 6b to explain that within the scope of the invention, it is provided that the plane of the material web to be moved, in the present case the plane of a stretching system and in particular of a simultaneous stretching system in the form of a film plane FE in which the stretching force acts, is to lie at a particular distance H from the motor engagement side MA, i.e. from the secondary lower side.

In this respect, in the embodiment according to FIG. 6a, the film plane FE is provided above the underlying linear motor drive. In the embodiment according to FIG. 6b, an extreme opposite thereto is shown, in which the film plane FE is located under the motor engagement side MA of the underlying linear motor drive.

As can be seen particularly from FIGS. 3 and 6a, the distance H in question should not be greater than the magnet length L and, in the embodiment shown, this magnet length L can have a value of 125 mm. (This value can also vary within wide limits). The maximum magnet length L can have values which should not be greater than, for example, 160 mm, in particular not greater than 150 mm, 140 mm, 130 mm, 120 mm or 100 mm. However on the other hand, the magnet length should also not be less than 40 mm, in particular not less than 50 mm, 60 mm, 70 mm, 80 mm, 90 mm or 100 mm.

It is also pointed out with regard to the mentioned distance H that positive values for H mean that the film plane FE as shown in FIG. 6a comes to rest above the motor engagement plane MA (of the underlying linear motor). These values for H should preferably lie within a range of 40 mm to 150 mm.

In other words, H should have a value which is not greater than in particular 140 mm, 130 mm, 120 mm, 110 mm or 100 mm. On the other hand, the value for H should also not be less than in particular 50 mm, 60 mm, 70 mm, 80 mm or 90 mm. FIG. 6b also shows that the values for H can also assume negative amounts, the above-mentioned minus signs meaning that the corresponding value is below the motor engagement plane MA, as shown in FIG. 6b.

In principle, the same also applies accordingly when the linear motor drive is only positioned above.

However, the gripper-conveying unit KT and the linear motor drive should also satisfy further conditions, this being explained with reference to FIG. 7.

FIG. 7 is a side view of a corresponding gripper-conveying unit KT, i.e. transversely to the feed direction VR. It is possible to see the rollers 505a which roll on the upper running surface 15b and also the opposing rollers 505b which roll on the downwardly directed running surface 15b. These are positioned offset to one another in the feed direction.

The length L of the secondary part 503 can also be seen.

FIG. 7 also shows that the secondary part 503 with the permanent magnet 503a (with or without cage 503b) has a particular magnet length L which is to be in a particular relationship with the above-mentioned distance H between the film plane FE and the motor engagement side MA. This relationship should satisfy the following condition:

$$H/L \leq 1.0$$

In this respect, the permanent magnet 503a, provided only on one side in realising a lower linear motor drive is arranged so that the implementation of the force direction does not result in any impermissible vibrations. This generally applies when the condition $H/L \leq 1$ is satisfied. Finally, FIG. 7 also shows that to achieve an optimum mounting while avoiding vibrations, the guide length RA between the roller bearings shown there with reference to FIG. 6 with respect to the upper rollers 505, 505a or between the preceding and subsequent roller bearings of the lower rollers 505, 505b should satisfy the following condition:

$$RA \leq L$$

Furthermore, FIG. 7 shows a gripper-conveying unit KT with associated gripper part 6 and conveying part 7, more specifically in a side view transversely to the feed movement VR. It can be seen that coming to rest on the conveying part in the feed direction VR are rollers or pairs of rollers, the axial distance RA of which between the roller axes 505' should be selected to be not less than 40 mm and generally not greater than 150 mm. Values greater than 50 mm, 60 mm, 70 mm, 80 mm, 90 mm or 100 mm and values less than 140 mm, 130 mm, 120 mm, 110 mm or 100 mm are favourable and adequate in many cases.

This applies particularly to the upper weight-bearing rollers 505a which have to receive and support the weight and the additional forces generated by the lower linear motor, an embodiment with a lower linear motor being particularly preferred (when upper and lower linear motors are used, a linear motor drive is preferred in which the lower linear motor, i.e. as stated, the lower primary parts introduce greater forces and attractive forces than the upper linear motor).

In the described embodiment with reference to FIG. 7, if sliding elements or pairs of sliding elements are used instead of the rollers or pairs of rollers, in the corresponding dimensioning of the distances and particularly of distance RA, reference will be respectively made to the distance between the centres (middle points) of two sliding elements which are adjacent in the running direction.

It emerges in particular from the statements made above that whenever the relationship is between $$H/L \leq 1.0$$

and simultaneously $$RA \leq L,$$

the attractive forces generated by the linear motor drive have a particularly stabilising effect and contribute towards a significantly vibration-free running particularly also in the return of the stretching system. This applies irrespective of whether the film plane FE is provided below or above the linear motor, i.e. irrespective of whether conversely the linear motor is provided above or below the film plane.

However, cases of use are also possible in which the conditions should be such that either the relationship is $$H/L \leq 1.0$$

or the following condition $$RA \leq L$$

is satisfied.

In the case of machine tools with a linear motor drive, the guide length RA is very long, as is the length of the stator H and the distance, i.e. the guide length RA.

The same applies during the collision between grippers and during the opening and closing of the blade flap, because in these cases an additional force is applied which opposes the direction of movement.

In the following, reference is made to FIG. 8 which shows that the centre of gravity G of a gripper-conveying unit KT with the gripper part 6, the conveying part 7 and the bridge 8 connecting the gripper part 6 and the conveying part 7 should not exceed a maximum horizontal lateral distance c from the guide rail plane SE which extends vertically and passes through the centre of the guide rail 15.

If this distance c becomes greater than, for example 40 mm, tilting effects can increase which can lead to instability. The centre of gravity G of the respective gripper-conveying unit KT should preferably be at a distance of less than 40 mm, in particular less than 35 mm, 30 mm, 25 mm, 20 mm, 15 mm, 10 mm or 5 mm from the guide rail plane SE which passes through the guide rail. In other words, the closer the centre of gravity is to the guide rail plane SE, the better the conditions.

FIG. 9 shows in a development of FIG. 8 that the risk of the gripper-conveying unit KT tilting, based on the guide rail and/or support rail 15, can exist even in the case of corresponding tolerances or tolerance errors. Consequently, the distance d between the centre planes, vertical to the rotational axes, of the upper pair of rollers 505, 505a should be in a predetermined relationship with the distance c between the centre of gravity G and the guide rail plane SE passing through the centre of the guide rail and/or support rail 15. In this respect, the mentioned distance d should be related as follows to the distance c of the centre of gravity G so that tilting moments lie within an acceptable range, namely:

$$c \leq 1.5d.$$

In particular, values according to the following formulae are preferred:

$$c \leq 1.4d \text{ or}$$

$$c \leq 1.3d \text{ or}$$

$$c \le 1.2d \text{ or}$$

$$c \le 1.1d \text{ or}$$

$$c \le 1.0d.$$

The values of d ultimately also depend on the thickness of the guide rail 15, i.e. on the width of the upper running or sliding surface 15*a*. Usually, these values ford can be and should be less than 40 mm, in particular less than 37.5 mm, 35 mm, 32.5 mm, 30 mm, 27.5 mm, 25 mm, 22.5 mm or less than 20 mm. On the other hand, the values for the measurement d will usually be at least 12 mm. It is also possible for the values of d to be greater than 15 mm, 17.5 mm, 20 mm, 22.5 mm or 20 mm.

The measurements for value c are finally also fixed by the above-mentioned measurements. In an optimum case, the value of c can be 0 if the centre of gravity does not lie in the guide rail plane SE passing through the centre of the guide rail 15. In this respect, c ought to have values which are not above 50 mm, thus in particular, if possible, 45 mm, in particular 40 mm, 35 mm, 30 mm, 25 mm, 20 mm, 15 mm, 10 mm and in particular 5 mm.

Finally, a further contribution towards improving the invention can be provided in that the arrangement of the lower rollers 505, 505*b* is located at an optimum height.

It has proved to be favourable when the film height, i.e. the plane in which the conveyed web, particularly in the form of a plastics film is held clamped in the stretching system, i.e. the film plane FE lies at the height of the lower running surface 15*b* of the guide rail and/or support rail 15 or lower.

Since it is sometimes possible to dispense with these opposite rollers 505*b*, if appropriate, particularly in the case of a single lower linear motor drive (since both the weight forces and the attractive forces introduced by the linear motor drive are fully supported by the upper rollers 505, 505*a*), it can generally be stated that the material web plane FE should be at a height at which the lowest rollers 505*c* and/or 505*d* which rotate about a vertical axis roll on the guide rail and/or support rail 15 or at which corresponding sliding elements are guided in a sliding manner. This position and/or plane is called the roller plane LE. This is shown in FIG. 6*a*.

Finally, reference is made to two further embodiments which basically show that the advantages according to the invention and further preferred embodiments can also be realised using a guide rail 15 which is formed in a completely different way.

In the variant according to FIG. 10, the guide rail 15, 15*a* is formed in the manner of an upside-down T profile, more specifically with a vertical guide rail portion 115 and a horizontal guide rail portion 117 which adjoins underneath. The upper rollers or pairs of rollers 505, 505*a* which are offset in the feed direction can roll on the lower horizontal guide rail portion 117 which projects in both lateral directions respectively from the central, vertically extending guide rail portion 115 and they can absorb thereby the entire load of the gripper-conveying unit KT as well as the attractive forces which are applied via the lower linear motor drive. Alternatively or additionally, sliding elements can also be arranged in this region instead of rollers.

The corresponding rollers and pairs of rollers 505*c*, 505*d* which rotate about a vertical axis with reference to the other embodiments run on the two opposite vertically oriented running surfaces 15*c* and 15*d* of the vertical guide rail portion 115.

The actual conveying part 7 is configured in the manner of a horizontal C profile with an upwardly directed opening region, the vertical guide rail portion 115 engaging through the upwardly directed opening region 601 into the interior region of the conveying part 7 formed as a horizontal C. The secondary part 503 which has also been mentioned in the other embodiments, with the permanent magnets 503*a* and the cage 503*b* is then formed or provided on the underside of the thus formed conveying part 7. Arranged below at a short distance therefrom is the lower linear motor drive with the associated primary part 502 which is also held by the common supporting device TE which is rigidly connected to the guide rail.

The variant according to FIG. 11 is constructed similarly to the embodiment according to FIG. 10. What is different is that the guide rail 15 with its upper vertical guide rail portion 115 is relatively short and this guide rail portion as part of the entire supporting device TE is connected to a lower horizontal portion 117 on which the rollers and pairs of rollers 505, 505*a* roll, rotating about a horizontal rotational axis. For this purpose, also provided on the lower horizontal guide rail portion 117 in an appropriate spacing of the rollers 505, 505*a* are vertical ridges 119 to make the running surface 15*a* higher. This produces an accommodation space 603 between the two vertical ridges 119 arranged with a lateral offset transversely to the longitudinal direction of the guide rail, in which accommodation space the linear motor drive with its primary part 502 can be accommodated.

Common to both embodiments according to FIGS. 10 and 11 is the fact that consequently, the horizontal running surfaces 15*a* can be received with a large lateral spacing to receive the weight of the gripper-conveying unit KT and to support the feed and drive forces introduced by the linear motor drive, as a result of which tilting forces which may arise can be absorbed and prevented much more effectively, which forces could otherwise act on the gripper-conveying unit KT particularly in the event of tolerance errors, as has been explained for example with reference to FIG. 8.

Thus, the especially stated formula $$c \le 1.5d$$

can be observed and implemented far more easily according to these embodiments of FIGS. 10 and 11. In this embodiment, the lateral distance c of the centre of gravity G from the guide rail plane SE is even shorter or very much shorter than the distance d between the two rollers 15*c*, 15*d* positioned to the left and right of the guide rail 115 of the vertical guide rail portion 115 or accordingly between the sliding elements provided there.

The invention claimed is:

1. Linear motor-driven conveying system for stretching and simultaneous stretching, comprising:
    a guide rail and/or conveying rail along which a gripper-conveying unit having a gripper part and a conveying part is displaceable lengthways by a linear motor drive, wherein
    the linear motor drive comprises secondary parts which are displaceable with the conveying part, are attached fixedly thereto and are in the form of permanent magnets, and comprises fixed primary parts in a small spacing gap therefrom, for generating electromagnetic fields, the primary parts acting on a motor engagement side of the secondary parts while the secondary parts continue to move,
    the gripper part comprises a clamping device for fixing an edge of a material web, thereby defining a material web plane, the conveying system comprises either
a) only one linear motor drive provided below the conveying part, or
b) only one linear motor drive provided above the conveying part, and
the conveyed web is fixed to the gripper part, thereby defining a conveyed web plane, the conveyed web plane being arranged at a height distance (H) with respect to the motor engagement side of the single linear motor drive, the height distance (H) being less than or equal to the length (L) of the secondary parts on the conveying part
wherein rollers support the load of the gripper-conveying unit and rolling on the upper running surface of the guide rail and/or sliding elements mounted such that they are slidingly displaceable on the upper running surface of the guide rail and/or support rail are positioned in a feed direction of the gripper-conveying unit so that the distance between the rollers and/or the distance between the center or centers of gravity of the sliding elements in the feed direction has a value which is less than or equal to the length (L) of the secondary parts,
wherein at least two running wheels, arranged on the upper running surface of the guide rail and/or support rail with a lateral offset to the feed direction, and/or provided sliding parts are positioned such that a lateral distance (d) between the centers of the running wheels and/or between the centers of the sliding parts with respect to the horizontal lateral distance (c) of the center of gravity of the gripper-conveying unit from the guide rail plane satisfies the following condition:

$$c \leq 1.0 d$$

where d is the distance between center planes which extend vertically to the rotational axes of an upper pair of rollers or extend centrally through a corresponding pair of sliding elements in a vertical orientation.

2. Conveying system according to claim 1, wherein the length (L) of the secondary parts are less than or equal to 150 mm and/or the length (L) of the secondary parts are greater than or equal to 40 mm.

3. Conveying system according to claim 1, wherein the center of gravity of the gripper-conveying unit has a distance (c) from a guide rail plane which passes centrally and vertically through the guide rail and/or support rail, which distance is less than or equal to 50 mm.

4. Conveying system according to claim 1, wherein the distance (d) is less than or equal to 40 mm and/or the distance (d) is greater than or equal to 12 mm.

5. Conveying system according to claim 1, wherein rollers are provided on the upper running surface of the guide rail and/or support rail, offset in the feed direction and/or sliding parts are arranged offset in a feed direction have with respect to the centers thereof a distance which is less than or equal to 150 mm and/or is greater than or equal to 40 mm.

6. Conveying system according to claim 1, wherein the distance (H) between the conveying plane and the motor engagement side is less than or equal to 150 mm and/or is greater than or equal to 40 mm.

7. Conveying system according to claim 1, wherein the width of a primary part selected from the primary parts and/or of a secondary part selected from the secondary parts and cooperating with the primary part is selected and arranged with respect to the width extent such that the center of the primary part and/or the center of the secondary part is at a distance of less than 15% of the entire motor width of the primary part or of the entire motor width of the secondary part from the guide rail plane.

8. Conveying system according to claim 1, wherein a respective nozzle box is arranged above and below the gripper-conveying unit, and a gripper table for clamping a conveyed web between the upper and lower nozzle box is arranged centrally or deviates therefrom by less than 10% based on a total distance (B) between the upper and the lower nozzle box.

9. Conveying system according to claim 1, wherein the distance between an upper and a lower nozzle box, between which the gripper-conveying unit is arranged at a distance (B) from the nozzle boxes by the linear motor drive provided only below or only above the gripper-conveying unit, which distance is less than 700 mm.

10. Conveying system according to claim 1, wherein the length (L) of a secondary part selected from the secondary parts is less than or equal to 110 mm and/or the length (L) of the secondary part is greater than or equal to 90 mm.

11. Conveying system according to claim 1, wherein the center of gravity of a gripper-conveying unit has a distance (c) from a guide rail plane which passes centrally and vertically through the guide rail and/or support rail, which distance is less than or equal to 5 mm.

12. Conveying system according to claim 1, wherein the distance (d) is less than or equal to 30 mm and/or the distance (d) is greater than or equal to 20 mm.

13. Conveying system according to claim 1, wherein the rollers provided on the upper running surface of the guide rail and/or support rail, offset in the feed direction and/or sliding parts arranged offset in the feed direction have with respect to the centers thereof a distance which is less than or equal to 110 mm and/or is greater than or equal to 90 mm.

14. Conveying system according to claim 1, wherein the distance (H) between the conveying plane and the motor engagement side is less than or equal to 110 mm and/or is greater than or equal to 90 mm.

15. Conveying system according to claim 1, wherein the width of a primary part selected from the primary parts and/or of a secondary part selected from the secondary parts and cooperating with the primary part is selected and arranged with respect to the width extent such that the center of the primary part and/or the center of the secondary part is at a distance of less than 5% of the entire motor width of the primary part or of the entire motor width of the secondary part from the guide rail plane.

16. Conveying system according to claim 1, wherein the distance between an upper and a lower nozzle box, between which the gripper-conveying unit is arranged at a distance (B) from the nozzle boxes by the linear motor drive provided only below or only above the gripper-conveying unit, which distance is between 150 mm and 700 mm.

17. Linear motor-driven conveying system for stretching and simultaneous stretching, comprising:
a guide rail and/or conveying rail along which a gripper-conveying unit having a gripper part and a conveying part is displaceable lengthways by a linear motor drive, wherein
the linear motor drive comprises secondary parts which are displaceable with the conveying part, are attached fixedly thereto and are in the form of permanent magnets, and comprises fixed primary parts in a small spacing gap therefrom, for generating electromagnetic fields, the primary parts acting on a motor engagement side of the secondary parts while the secondary parts continue to move, the gripper part comprises a clamping device for fixing an edge of a material web, thereby defining a material web plane, the conveying system comprises either a) only one linear motor—provided below the conveying part, or b) only one linear motor drive provided above the conveying part, and the conveyed web is fixed to the gripper part, thereby defining a conveyed web plane, the conveyed web plane being arranged at a height distance (H) with respect to the motor engagement side of the single linear motor drive, the height distance (H) being less than or equal to the length (L) of the secondary parts on the conveying part, wherein at least two running wheels, arranged on the upper running surface of the guide rail and/or support rail with a lateral offset to the feed direction, and/or provided sliding parts are positioned such that a lateral distance (d) between the centers of the running wheels and/or between the centers of the sliding parts with respect to the horizontal lateral distance (c) of the center of gravity of the gripper-conveying unit from the guide rail plane satisfies the following condition:

$c \leq 1.0 d,$ where d is the distance between center planes which extend vertically to the rotational axes of an upper pair of rollers or extend centrally through a corresponding pair of sliding elements in a vertical orientation, wherein the width of a primary part selected from the primary parts and/or of a secondary part selected from the secondary parts and cooperating with the primary part is selected and arranged with respect to the width extent such that the center of the primary part and/or the center of the secondary part is at a distance of less than 15% of the entire motor width of the primary part or of the entire motor width of the secondary part from the guide rail plane.

* * * * *